(12) United States Patent
Dupuy et al.

(10) Patent No.: US 6,645,620 B1
(45) Date of Patent: Nov. 11, 2003

(54) MATERIAL BASED ON HALOGENATED THERMOPLASTIC RESIN, COMPRISING LONG FIBERS, METHODS FOR MAKING SAME AND USES

(75) Inventors: Carole Dupuy, Bernay (FR); Philippe Renouard, Bernay (FR); Régis Jacquemet, Saint Paul les Dax (FR)

(73) Assignee: Atofina, Paris-la-Defense (FR)

( * ) Notice: Subject to any disclaimer, the term of this patent is extended or adjusted under 35 U.S.C. 154(b) by 0 days.

(21) Appl. No.: 09/856,525

(22) PCT Filed: Oct. 8, 1999

(86) PCT No.: PCT/FR99/02421

§ 371 (c)(1),
(2), (4) Date: Sep. 25, 2001

(87) PCT Pub. No.: WO00/31177

PCT Pub. Date: Jun. 2, 2000

(30) Foreign Application Priority Data

Nov. 23, 1998 (FR) .............................................. 98 14700

(51) Int. Cl.[7] .................................................. D02G 3/00
(52) U.S. Cl. ...................... 428/361; 428/407; 523/217; 523/205; 523/206

(58) Field of Search .................................. 428/407, 361; 523/217, 205, 206

(56) References Cited

U.S. PATENT DOCUMENTS

| 4,581,392 A | | 4/1986 | Armstrong et al. |
| 4,937,028 A | | 6/1990 | Glemet et al. |
| 5,047,263 A | | 9/1991 | Glemet |
| 5,198,303 A | * | 3/1993 | Greenlee et al. ............ 428/463 |
| 5,767,174 A | * | 6/1998 | Nakagawa et al. |

FOREIGN PATENT DOCUMENTS

| EP | A1-0 056 703 | 7/1982 |
| EP | B1-0 056 703 | 3/1987 |
| EP | B2-0 056 703 | 3/1987 |

* cited by examiner

*Primary Examiner*—Leszek Kiliman
(74) *Attorney, Agent, or Firm*—Pennie & Edmonds LLP

(57) ABSTRACT

The invention concerns a material based on halogenated thermoplastic resin, comprising long fibers, characterized in that at least one long fiber is in close contact with a polymer based on alkyl (meth)acrylate. The invention also concerns the methods for making such a material and its uses.

20 Claims, No Drawings

MATERIAL BASED ON HALOGENATED THERMOPLASTIC RESIN, COMPRISING LONG FIBERS, METHODS FOR MAKING SAME AND USES

The present invention relates to a material based on a halogenated thermoplastic resin, comprising long fibers, its manufacturing processes and its applications.

The incorporation of mineral fibers in order to reinforce and improve the mechanical properties of molded articles based on a thermoplastic polymer is known.

Thus, to produce thermoformable structures having a flexural modulus which approaches the theoretically possible levels, document EP 56703 teaches to wet the reinforcing filaments, in parallel alignment, with a molten thermoplastic polymer.

Document FR 2579133 discloses a fiber-reinforced thermoplastic polymer composite in which the intimate bonding between the polymer and the fibers is provided by a second thermoplastic polymer, compatible with the first, promoting fiber wetting. It teaches that this composite results in articles having improved mechanical properties because of the interposition, between the standard thermoplastic polymer and the fibers, of a second thermoplastic polymer promoting wetting.

Moreover, French Patent FR 2 630 967 has described a process for manufacturing thermoplastics reinforced by long fibers, consisting in impregnating each fiber with a thermoplastic wetting polymer before sheathing the fibers by a thermoplastic polymer compatible with the wetting thermoplastic.

When glass fibers are incorporated in order to reinforce and improve the properties of articles based on a vinyl chloride resin, it is found that the increase in stiffness of these articles is often accompanied by a degradation in their impact strength.

Given the high viscosity of a vinyl chloride resin, when implementing the reinforcing process problems specific to it are encountered that cannot be solved by the teaching of the abovementioned prior art on reinforced thermoplastics.

Thus, on the one hand the wetting of the glass fibers with a vinyl chloride resin is unsatisfactory and, on the other hand, during mixing, the glass fibers are subjected to high stresses, and are therefore often broken, and end up with a reduced length.

Consequently, it is virtually impossible to obtain a uniform dispersion of long fibers in a material based on a vinyl chloride resin.

In addition, a poor dispersion of glass fibers in a material based on a vinyl chloride resin is in general manifested by flaws in the surface appearance of the articles made from such a material.

The problems specific to materials based on a vinyl chloride resin were disclosed in document EP 773 259. That document proposes to solve these problems and teaches, by its example 10, to prepare, in a first step, glass fibers coated with a graft copolymer (G1) consisting of 27% by weight of acrylonitrile units, 68% by weight of styrene units and 5% by weight of glycidyl methacrylate units, by impregnating glass fibers 3 mm in length and 13 $\mu$m in diameter in a homogeneous solution comprising acrylonitrile, styrene, glycidyl methacrylate and benzoyl peroxide, then by adding water to the solution and, finally, heating the mixture at a polymerization temperature of 80° C. for 5 hours. After polymerization, the coated glass fibers are washed with water and then dried at 60° C. in order to give a material (G1) containing 80% glass fibers by weight.

In a second step, a copolymer (e3) is prepared by heating, under nitrogen at 170° C. for 2 hours, a reaction mixture consisting of polypropylene, an antioxidant, dicumyl peroxide and methyl methacrylate. After polymerization, the copolymer is washed with acetone and then dried in order to give a block copolymer (e3) consisting of 70% by weight of a polypropylene block and 30% by weight of a polymethyl methacrylate block.

Finally, in a third step, 35 parts by weight of the material (G1), 5 parts by weight of block copolymer (e3), 100 parts by weight of a vinyl chloride resin (A), 3 parts by weight of a dibutyltin mercaptide and 0.5 parts by weight of stearic acid are mixed and then the mixture is extruded in order to give a sheet 3 mm in thickness and 30 mm in width.

Although the solution proposed in document EP 773 259 makes it possible to obtain articles, based on a vinyl chloride resin, having good mechanical properties and a correct surface finish, it nevertheless has the drawback of being complex and expensive.

It is an object of the present invention to provide a novel material based on a halogenated thermoplastic resin, comprising long fibers, capable of giving articles having good impact strength together with sufficient rigidity and a correct surface finish.

This material is characterized in that at least one long fiber is in intimate contact with an alkyl-(meth)acrylate-based polymer or polymer blend.

The subject of the invention is more particularly a material based on a halogenated thermoplastic resin, comprising long fibers, characterized in that each long fiber is in intimate contact with an alkyl-(meth)acrylate-based polymer or polymer blend.

Preferably, the material based on a halogenated thermoplastic resin comprises long fibers which are in intimate contact with an alkyl-(meth)acrylate-based polymer or polymer blend and are in almost parallel alignment.

According to the invention, the material is advantageously in granule form.

The cross section of these granules preferably consists of a core of long fibers in intimate contact with the alkyl-(meth)acrylate-based polymer and of an outer layer based on a halogenated thermoplastic polymer. In addition, the length of these granules corresponds to that of the fibers and is preferably greater than 3 mm.

As halogenated thermoplastic polymer, mention may be made especially of vinyl-chloride-based or vinyl-fluoride-based polymers, polymers based on vinylidene fluoride, polytetrafluoroethylene, polyfluoroalkyl vinyl ether, polyhexafluoropropylene and polychlorotrifluoroethylene. Vinyl-chloride-based polymers and those based on vinylidene fluoride are preferred.

In the foregoing and hereafter:
  the term "long fibers" is understood to mean fibers whose length is generally greater than 1 mm, advantageously greater than 3 mm and preferably between 4 and 100 mm;
  the term "alkyl-(meth)acrylate-based polymer" is understood to mean homopolymers and copolymers, the latter containing at least 70% and preferably at least 90% by weight of an alkyl methacrylate and/or acrylate and at least one other monomer chosen especially from olefins, unsaturated polycarboxylic acids, such as maleic, fumaric and itaconic acids, and their aliphatic, cycloaliphatic and aromatic esters, their amides and their nitrites, amides and nitrites of an unsaturated carboxylic acid such as acrylic or methacrylic acid, and vinyl esters of monocarboxylic and polycarboxylic acids, such as vinyl acetate, propionate and benzoate;

the term "vinyl-chloride-based polymers" is understood to mean homopolymers and copolymers, the latter containing at least 50% by weight of vinyl chloride and at least one monomer copolymerizable with vinyl chloride. The copolymerizable monomers are those generally used in conventional vinyl chloride copolymerization techniques. Mention may be made of vinyl esters of monocarboxylic and polycarboxylic acids, such as vinyl acetate, propionate and benzoate; unsaturated monocarboxylic and polycarboxylic acids, such as acrylic, methacrylic, maleic, fumaric and itaconic acids, and their aliphatic, cycloaliphatic and aromatic esters, their amides and their nitriles; vinyl and vinylidene halides; alkyl vinyl ethers; olefins.

Among vinyl-chloride-based polymers, vinyl chloride homopolymers are preferred.

The vinyl-chloride-based polymers may be prepared by known methods, such as emulsion polymerization, suspension or microsuspension polymerization and mass polymerization.

As vinylidene-fluoride-based polymers, mention may especially be made of vinylidene fluoride (VF2) homopolymers and copolymers preferably containing at least 50% by weight of VF2 and at least one other fluoromonomer such as chlorotrifluoroethylene (CTFE), hexafluoropropylene (HFP), trifluoroethylene (VF3) and tetrafluoroethylene (TFE); trifluoroethylene (VF3) homopolymers and copolymers, the copolymers, and in particular the terpolymers, combining the residues of the CTFE, TFE, HFP and/or ethylene units and possibly the VF2 and/or VF3 units. The number-average molecular mass of the vinylidene-fluoride-based polymers is between 10000 and 1000000 and preferably between 100000 and 600000.

The preferred alkyl (meth)acrylate homopolymers and copolymers are those having at most four carbon atoms in the alkyl group. By way of example, mention may be made of polymethyl acrylate, polyethyl acrylate, polymethyl methacrylate, polyethyl methacrylate, methyl methacrylate/n-butyl methacrylate copolymer and methyl methacrylate/ethyl acrylate copolymer. Advantageously, polyethyl methacrylate, methyl methacrylate/n-butyl methacrylate copolymer and methyl methacrylate/ethyl acrylate copolymer are used.

The weight-average molecular masses of the alkyl-(meth)acrylate-based polymer are generally between 1000 and 100000 and preferably between 10000 and 80000. Average molecular masses of around 40000 are most particularly suitable.

According to the present invention, the material generally consists of 10 to 60% by weight of long fibers, 3 to 20% by weight of an alkyl-(meth)-acrylate-based polymer and 87 to 20% of a halogenated thermoplastic polymer.

The long fibers represent about 55 to 75% by weight of the assembly consisting of long fibers in intimate contact with the alkyl-(meth)acrylate-based polymer.

The long fibers used to reinforce the material based on a halogenated thermoplastic resin are known. They are organic or mineral fibers and may be continuous. Continuous fibers are preferred and, by way of example, mention may be made of rovings of glass, silica, carbon or aramid fibers. The long fibers may also be sized.

According to the invention, the processes for manufacturing the material have the advantage of being simple and inexpensive. Thus, a first method consists in wetting the long fibers with the alkyl-(meth)-acrylate-based polymer in the melt state, and then in mixing the halogenated thermoplastic polymer with the impregnated fibers, and optionally with additives, such as heat stabilizers, antioxidants and mineral fillers. The long fibers may also be wetted with an alkyl-(meth)acrylate-based polymer emulsion.

When fiber rovings are used, it is preferred to wet them by making them pass continuously through a tank containing the alkyl-(meth)acrylate-based polymer in the melt state. After the rovings have been wetted, they are chopped and mixed with the halogenated thermoplastic polymer, and optionally with additives such as heat stabilizers, antioxidants and mineral fillers.

A second method of obtaining the material of the invention consists in intimately impregnating the rovings with an alkyl-(meth)acrylate-based polymer before sheathing them by a halogenated thermoplastic polymer. Preferably, prior to their impregnation by the alkyl-(meth)acrylate-based polymer, the rovings are fanned out. This process can be implemented in the plant shown schematically by FIG. 1 of document FR 2 630 967.

Thus, in this configuration, the intimate impregnation of each fiber consists in impregnating rovings with one or more alkyl-(meth)acrylate-based polymers in a crosshead feed die. After leaving the impregnation die, the impregnated rovings are then taken up in a second die, also a crosshead feed die, where they are sheathed by a halogenated thermoplastic polymer.

Before the rovings pass through the impregnation die, they are fanned out so that each of the roving fibers is spread out more or less side by side. The rovings are in this case in the form of a web or tape consisting of a succession of parallel continuous individual fibers. To achieve this fiber alignment by fanning out the roving, the rovings are introduced into the impregnation die fed with the alkyl-(meth)acrylate-based polymer melt after they have passed through at least one deflector of a spreader bar zone which, forcing the roving, causes the fibers of which it is composed to spread out. The web or tape thus formed is then impregnated with the alkyl-(meth)acrylate-based polymer and drawn through a new spreader bar system formed from deflectors approximately parallel to the first deflector(s). In this system, the web or tape impregnated with the alkyl-(meth)acrylate-based polymer passes through at least two opposed and mutually parallel deflectors. Under these conditions, all the fibers impregnated with the alkyl-(meth)acrylate-based polymer are, in the first deflector, pressed down against one of its faces, forcing the resin in the melt state to infiltrate between the fibers in order to pass to the opposite face. The reverse effect occurs when all the impregnated fibers come into contact with the opposite deflector. This spreader bar system before and after contact with the alkyl-(meth)acrylate-based polymer allows the fibers to be individually impregnated with the minimum of polymer. Finally, the impregnated fibers pass through a forming zone allowing tapes or rods to be produced. Thus, the first step of the second process of the invention comprises the fanning-out, the impregnation and the forming of the rovings.

After leaving the die, the fibers impregnated with the alkyl-(meth)acrylate-based polymer are, in the second step, sheathed by the halogenated thermoplastic resin to be reinforced. To do this, the continuous fibers impregnated with the alkyl-(meth)acrylate-based polymer preferably at a temperature about 40° C. above the melting point of said alkyl-(meth)-acrylate-based polymer pass through a conventional crosshead die, such as that used for the jacketing of wire or cable. This die is fed with the halogenated thermoplastic resin intended to be fiber-reinforced, and optionally with additives such as heat stabilizers, antioxidants and mineral fillers, and is approximately in alignment with the forming zone of the first die. At the die exit, the tapes or rods are granulated to a predetermined length which, according to the process, can be chosen arbitrarily. These granules containing long fibers, the length of the fibers corresponding to that of the granule, are particularly suitable for injection molding, compression molding and transfer extrusion.

When the continuous fibers impregnated with the alkyl-(meth)acrylate-based polymer leave the impregnation die, the impregnation polymer is still in the melt state. Preferably, they cool on contact with the ambient air before entering the second die fed with the sheathing resin. Before entering this die, the continuous fibers impregnated with the alkyl-(meth)acrylate-based polymer are generally at a temperature of between 40 and 80° C.

The distance between the die for impregnating the fibers impregnated with the alkyl-(meth)acrylate-based polymer and the sheathing die depends on the thermal characteristics of the impregnation polymer. This distance also depends on the speed at which the rods are hauled off. Preferably, this distance must be as short as possible and, in practice, is usually between 0.1 and 4 meters.

The present invention also relates to molded articles obtained, especially, by compression molding, injection molding, injection-compression molding, extrusion or transfer extrusion of the material, based on a halogenated thermoplastic polymer, comprising long fibers. As molded articles, mention may be made of electrical cabinets, pipe fittings, gutters, window sections, sections for building structures, and panels for wall coverings.

The following examples illustrate the invention without however limiting it.

Unless otherwise indicated, the inherent viscosity is defined as that of a solution of 0.25 g of polymer in 50 cm$^3$ of dichloromethane, at 20° C., measured using a Cannon-Fenke No. 50 viscometer. continuous fibers impregnated with the alkyl-(meth)acrylate-based polymer are generally at a temperature of between 40 and 80° C.

The distance between the die for impregnating the fibers impregnated with the alkyl-(meth)acrylate-based polymer and the sheathing die depends on the thermal characteristics of the impregnation polymer. This distance also depends on the speed at which the rods are hauled off. Preferably, this distance must be as short as possible and, in practice, is usually between 0.1 and 4 meters.

The present invention also relates to molded articles obtained, especially, by compression molding, injection molding, injection-compression molding, extrusion or transfer extrusion of the material, based on a halogenated thermoplastic polymer, comprising long fibers. As molded articles, mention may be made of electrical cabinets, pipe fittings, gutters, window sections, sections for building structures, and panels for wall coverings.

The following examples illustrate the invention without however limiting it.

Unless otherwise indicated, the inherent viscosity is defined as that of a solution of 0.25 g of polymer in 50 cm$^3$ of dichloromethane, at 20° C., measured using a Cannon-Fenke No. 50 viscometer.

The melt flow index (MFI) is measured at 190° C. under a load of 2.16 kg.

EXAMPLE 1

The impregnation die maintained at 270° C. was fed with polyethyl methacrylate (ELVACITE 2043) having an inherent viscosity of 0.21, coming from a single-screw crosshead extruder. The impregnation die used was of the same type as that in FIG. 1 of FR 2630967 and comprised the following zones:

Spreader bar zone 1:
 length: 70 mm,
 width: 145 mm,
 gap: 5 mm,
 flared entry and deflector with a dome 10 mm in height;

Impregnation die zone 2:
 length: 125 mm,
 width: 100 mm,
 6 feed channels of 20×5 mm rectangular cross section,
 zone exit gap: 5 mm;

Spreader bar zone 3:
 length: 200 mm,
 width: 100 mm,
 sinusoidal deflector bar with 7 peaks,
 inter-peak amplitude: 25 mm,
 gap: 3 mm;

Soaking zone 3a (identical to zone 4):
 length: 500 mm,
 width: 145 mm;

Shaping zone 4:
 die having 6 holes 1.8 to 2 mm in diameter,
 length: 175 mm,
 width: 100 mm.

Six 2400 tex E-glass rovings were made to pass through the impregnation die.

The polyethyl methacrylate output was about 13 kg/h. Rods having a glass content of about 55% by weight were pulled through 2 mm diameter holes at a rate of 15 m/min.

Next, these rods passed through a sheathing die placed at 20 cm from the impregnation die.

This second die, approximately in alignment with the first, was kept at a temperature of 210° C. It was mounted as a crosshead on a single-screw extruder kept at an average temperature of 180° C. and fed with a vinyl chloride homopolymer having a K value of 50, prepared by suspension polymerization. Rods having a glass fiber content of about 24% by weight were pulled through 5.4 mm diameter holes in this die, these rods then being cooled and granulated to a length of 12 mm.

Three-point bending tests (ISO 178 standard) and Charpy impact tests (ISO 179 standard) were carried out on 80 mm×10 mm×4 mm test pieces molded by injection molding the granules.

Multiaxial impact tests (ISO 6603-2:89 standard) were carried out at a rate of 4.3 m/s on 100 mm×100 mm×4 mm plaques molded by injection molding the granules.

The impregnation of the fibers was evaluated qualitatively by the appearance of the granules. A poor impregnation gave rise to poor cutting of the granules with some fibers detached from the impregnation polymer, and certain fibers projecting from the granules ("moustache" effect). Also observed were flaws in the surface appearance of the materials obtained by injection molding these granules.

The test results and the impregnation quality are given in table 1.

EXAMPLE 2

Not According to the Invention

The procedure was the same as in example 1 except that the impregnation die is not fed.

EXAMPLE 3

The procedure was as in example 1 except that the impregnation die crosshead extruder was maintained at 290° C. and fed with a methyl methacrylate (40 wt %)/n-butyl methacrylate (60 wt %) copolymer (ELVACITE 2614) having an inherent viscosity of 0.21.

EXAMPLE 4

Example 1 was repeated, except that the impregnation die crosshead extruder was fed with a methyl methacrylate (50 wt %)/ethyl acrylate (50 wt %) copolymer (NEOCRYL B 722).

The weight-average molecular mass of the copolymer was about 55 000.

EXAMPLE 5

Not According to the Invention

The procedure was as in example 1 except that the impregnation die crosshead extruder was fed with an ethylene (28 wt %)/vinyl acetate (72 wt %) copolymer having a melt flow index (MFI) of 800.

The impregnation was very poor, the copolymer forming a "rubbery gangue" around the fibers without impregnating them to the core.

EXAMPLE 6

Not According to the Invention

The procedure was as in example 1 except that the impregnation die crosshead extruder was maintained at 300° C. and fed with an ethylene (90.6 wt %)/ethyl acrylate (6.5 wt %)/maleic anhydride (2.9 wt %) terpolymer. This terpolymer had an MFI of 200.

The impregnation was very poor and the same phenomenon as in the previous example was observed.

EXAMPLE 7

Example 1 was repeated except that the impregnation die was maintained at 280° C. and the coating die at 240° C. The latter was mounted as a crosshead on a single-screw extruder maintained at an average temperature of 200° C. and fed with a PVDF (polyvinylidene fluoride) having an average molecular mass of about 100 000 g/mol. The haul-off speed was 20 m/min.

The mechanical properties were evaluated under the same conditions as for the previous examples and are given in table 2.

EXAMPLE 8

Example 7 was repeated except that the impregnation die crosshead extruder was not fed with an acrylic polymer but with a methyl methacrylate/n-butyl methacrylate copolymer having an inherent viscosity of 0.21 measured by the same method.

EXAMPLE 9

Not According to the Invention

The PVDF used in examples 7 and 8 was injected in the form of test pieces and these were characterized using the same methods described above. The mechanical properties obtained are given in table 2.

TABLE 1

| EXAMPLE | | 1 | 2* | 3 | 4 |
|---|---|---|---|---|---|
| Glass content | % | 24 | 24 | 24 | 23 |
| Flexural modulus | MPa | 6900 | 6700 | 7000 | 6700 |
| failure σ | MPa | 147 | 138 | 141 | 107 |
| Notched Charpy | kJ/m² | 9 | 4 | 8 | 5 |
| Multiaxial impact | Maximum E at F (J) | 10 | 6 | 7 | 6 |
| | Total E (J) | 23 | 20 | 23 | 23 |
| Appearance | Granules | Good | Poor, many loose fibers | Good | Good |
| | Injection-molded plaques | Good | Poor, many fiber packets on the surface | Good | Good |

*Comparative example

TABLE 2

| Example | | 7 | 8 | 9* |
|---|---|---|---|---|
| Glass content | % | 23 | 23 | 0 |
| Flexural modulus | MPa | 8550 | 7620 | 1995 |
| failure σ | MPa | 144 | 94 | |
| Notched Charpy | kJ/m² | 36 | 24 | 134 |
| Appearance | Granules | Good | Good | |

*Comparative example

What is claimed is:

1. A material consisting essentially of a halogenated thermoplastic polymer, a plurality of fibers and an alkyl-(meth)acryalte-based polymer, wherein the fibers are in intimate contact with the alkyl-(meth)acrylate-based polymer.

2. The material according to claim 1, wherein the fibers are substantially parallel to each other.

3. The material according to claim 1, wherein the material is in a granule form.

4. The material according to claim 1, which has a cross section containing cross sections of fibers in intimate contact with the alkyl-(meth)acrylate-based polymer and outer layer consisting essentially of the halogenated thermoplastic polymer.

5. The material according to claim 1, wherein the alkyl-(meth)acrylate-based polymer has at most four carbon atoms in the alkyl group.

6. The material according to claim 1, wherein the halogenated thermoplastic polymer is polyvinyl chloride or polyvinylidene fluoride.

7. A material comprising a halogenated thermoplastic polymer, a plurality of fibers and an alkyl-(meth)acrylate-based polymer, wherein the fibers are in intimate contact with the alkyl-(meth)acrylate-based polymer, and the fibers are substantially parallel to each other.

8. The material according to claim 7, herein the material is in a granule form.

9. The material according to claim 7, which has a cross section containing cross sections of fibers in intimate contact with the alkyl-(meth)acrylate-based polymer and outer layer of the halogenated thermoplastic.

10. The material according to claim 7, wherein the alkyl-(meth)acrylate-based polymer has at most four carbon atoms in the alkyl group.

11. The material according to claim 7, wherein the halogenated thermoplastic polymer is polyvinyl chloride or polyvinylidene fluorride.

12. A process for preparing a material comprising a halogenated thermoplastic polymer, a plurality of fibers and an alkyl-(meth)acrylate-based polymer, wherein the fiber is in intimate contact with the alkyl-(meth)acrylate-based polymer, which comprises:

impregnating the fiber(s) with the alkyl-(meth)acrylate-based polymer in an emulsion state or in a melt state; and mixing the impregnated fiber(s) with the halogenated thermoplastic polymer.

13. The process according to claim 12, wherein the halogenated thermoplastic polymer contains at least an additive.

14. The process according to claim 12, wherein the impregnating stage is conducted by continuously passing fiber rovings through the alkyl-(meth)acrylate-based polymer, then chopping the rovings to form the impregnated fibers.

15. The process according to claim 14, wherein the fiber rovings are fanned out prior to the impregnation step.

16. The process according to claim 14, wherein the fiber rovings are cooled after passing through the alkyl-(meth)acrylate-based polymer.

17. A process for preparing a material comprising a halogenated thermoplastic polymer, at least one fiber and an alkyl-(meth)acrylate-based polymer, wherein the fiber is in intimate contact with the alkyl-(meth)acrylate-based polymer, which comprises:

passing a fiber roving through the alkyl-(meth)acrylate-based polymer in an emulsion state or in a melt state to impregnate the fiber roving;

sheathing the impregnated fiber roving with the halogenated thermoplastic polymer; and chopping the impregnated and sheathed fiber roving.

18. The process according to claim 17, wherein the fiber roving is cooled after passing through the alkyl-(meth)acrylate-based polylmer.

19. An article which is prepared by molding the material of claim 1.

20. An article which is prepared by molding the material of claim 7.

* * * * *